(12) United States Patent
Brooksby et al.

(10) Patent No.: US 9,762,725 B2
(45) Date of Patent: *Sep. 12, 2017

(54) METHODS, DEVICES, AND SYSTEMS FOR TRANSFERRING AN ONGOING CALL OF A COMMUNICATION DEVICE USING A PORTABLE COMMUNICATION DEVICE

(71) Applicant: SORENSON IP HOLDINGS, LLC, Salt Lake City, UT (US)

(72) Inventors: Scot L. Brooksby, Highland, UT (US); Trevor Wagner, Eagle Mountain, UT (US); Tara Ault, Salt Lake City, UT (US); Bradley Grimm, Sandy, UT (US); Jennifer Harris, Layton, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,946

(22) Filed: Feb. 15, 2017

(65) Prior Publication Data

US 2017/0163796 A1    Jun. 8, 2017

Related U.S. Application Data

(60) Continuation of application No. 15/138,104, filed on Apr. 25, 2016, now Pat. No. 9,578,585, which is a
(Continued)

(51) Int. Cl.
*H04L 29/06* (2006.01)
*H04M 1/725* (2006.01)
*H04M 1/2745* (2006.01)
*H04M 1/64* (2006.01)
*H04M 3/58* (2006.01)
*H04N 7/14* (2006.01)
*G06F 3/0481* (2013.01)
*G06F 3/0484* (2013.01)
(Continued)

(52) U.S. Cl.
CPC ...... *H04M 1/72591* (2013.01); *G06F 3/0486* (2013.01); *G06F 3/04817* (2013.01); *G06F 3/04842* (2013.01); *H04M 1/27455* (2013.01); *H04M 1/642* (2013.01); *H04M 1/7253* (2013.01); *H04M 1/72583* (2013.01); *H04M 3/58* (2013.01); *H04N 7/147* (2013.01); *G06F 3/0488* (2013.01); *H04M 2242/12* (2013.01); *H04M 2250/60* (2013.01)

(58) Field of Classification Search
CPC .................................................. H04L 63/0884
USPC .............................................................. 726/4
See application file for complete search history.

(56) References Cited

U.S. PATENT DOCUMENTS 6,094,213 A    7/2000  Mun et al.
6,141,545 A    10/2000 Begeja et al.
(Continued)

*Primary Examiner* — Longbit Chai
(74) *Attorney, Agent, or Firm* — TraskBritt

(57) ABSTRACT

Systems and methods for controlling communication systems for the hearing impaired are disclosed. A portable communication device requests control over a plurality of communication devices. The portable communication device connects to and controls the plurality of communication devices. The portable communication device includes a user interface that enables a user to transfer a call from a first communication device to a second communication device.

20 Claims, 7 Drawing Sheets

Related U.S. Application Data division of application No. 14/641,156, filed on Mar. 6, 2015, now Pat. No. 9,325,840, which is a continuation of application No. 13/829,471, filed on Mar. 14, 2013, now Pat. No. 8,978,112.

(51) Int. Cl.
*G06F 3/0486* (2013.01)
*G06F 3/0488* (2013.01)

(56) References Cited

U.S. PATENT DOCUMENTS

| | | |
|---|---|---|
| 6,571,094 B1 | 5/2003 | Begeja et al. |
| 7,194,259 B2 | 3/2007 | DeLine |
| 7,404,001 B2 | 7/2008 | Campbell et al. |
| 7,515,905 B2 | 4/2009 | Begeja et al. |
| 7,526,763 B2 | 4/2009 | Kim |
| 7,689,232 B1 | 3/2010 | Beyer, Jr. |
| 2005/0094777 A1* | 5/2005 | McClelland ...... H04M 3/42391 379/52 |
| 2008/0273079 A1 | 11/2008 | Campbell et al. |
| 2010/0246571 A1 | 9/2010 | Geppert et al. |
| 2012/0095749 A1* | 4/2012 | Capretta ............. H04H 20/63 704/8 |
| 2014/0100899 A1 | 4/2014 | Boudville |

\* cited by examiner

METHODS, DEVICES, AND SYSTEMS FOR TRANSFERRING AN ONGOING CALL OF A COMMUNICATION DEVICE USING A PORTABLE COMMUNICATION DEVICE

CROSS-REFERENCE TO RELATED APPLICATIONS

This application is a continuation of co-pending U.S. patent application Ser. No. 15/138,104, filed Apr. 25, 2016, U.S. Pat. No. 9,578,585 (Feb. 21, 2017), which application is a divisional of U.S. patent application Ser. No. 14/641, 156, filed Mar. 6, 2015, now U.S. Pat. No. 9,325,840, issued Apr. 26, 2016, which is a continuation of U.S. patent application Ser. No. 13/829,471, filed Mar. 14, 2013, now U.S. Pat. No. 8,978,112, issued Mar. 10, 2015, the disclosures of each of which are hereby incorporated herein in their entirety by this reference.

FIELD

Embodiments of the application relate to video and telecommunication systems and methods for controlling communication systems and, more particularly, to systems and methods for controlling communication systems for the hearing impaired.

BACKGROUND

Conventionally, communication systems for the hearing impaired include a variety of communication devices and services. By way of example, Sorenson Communications® offers the Ntouch® VP videophone and the VP-200 videophone that utilize the Sorenson Video Relay Service,® a service that provides sign language interpretation to hearing impaired video phone users.

FIG. 1 is a simplified block diagram of a conventional communication system for the hearing impaired 100. The conventional communication system 100 includes one or more communication devices 102. The conventional communication system 100 also includes one or more servers 111, which provide services to the one or more communication devices 102, such as a relay service 106.

The one or more communication devices 102 connect independently to the one or more servers 111 through a communication network 104. The one or more communication devices 102 are controlled through attached, and/or dedicated remote, control interfaces 108.

As the communication devices 102 connect independently to the one or more servers 111, a user is afforded limited flexibility. To illustrate a limitation of the conventional communication system 100, a user having a plurality of communication devices 102 in a dwelling that is participating in a call on a first communication device 102-1 must terminate the call on the first communication device 102-1, and initiate a new call on a second communication device 102-2 in order to continue the conversation on the second device. This limitation may particularly inconvenience a busy user who needs to move about the dwelling during conversations.

To illustrate another limitation of the conventional communication system 100, a user controlling a first communication device 102-1 with a first control interface 108-1 must abandon the first control interface 108-1 in favor of a second control interface 108-2, in order to control a second communication device 102-2.

BRIEF SUMMARY

Disclosed are systems and methods for controlling communication systems for the hearing impaired.

Disclosed is a communication system that includes a plurality of communication devices. Each of the plurality of communication devices is configured to connect to a communication network. The communication system also includes a portable communication device. The portable communication device is configured to connect to the plurality of communication devices through the communication network. The portable communication device includes a user interface. The user interface is configured to receive a command from a user. The user interface is also configured to transfer a call from a first communication device of the plurality of communication devices to a second communication device of the plurality of communication devices responsive to the command.

In other embodiments, disclosed is a method of controlling a communication system for the hearing impaired. The method includes connecting a plurality of communication devices for the hearing impaired to a network. The method also includes connecting a portable communication device to the plurality of communication devices for the hearing impaired through the communication network. The method further includes receiving a command from a user through a user interface of the portable communication device. The method also includes transferring a call from a first communication device for the hearing impaired to a second communication device for the hearing impaired responsive to the command.

In other embodiments, disclosed is a communication system. The communication system includes at least one communication device. The communication system also includes a portable communication device. The portable communication device is configured to connect to an authentication service through a first network. The portable communication device is further configured to send a request to the authentication service to obtain permission for controlling the at least one communication device. The portable communication device is also configured to connect to and control the at least one communication device through at least one of the first network and a second network.

Also disclosed is a method of controlling a communication system for the hearing impaired. The method includes connecting a portable communication device to an authentication service through a first network. The method also includes sending a request from the portable communication device to the authentication service to obtain permission for the portable communication device to control a plurality of communication devices for the hearing impaired. The method further includes connecting the portable communication device to each of the plurality of communication devices for the hearing impaired through at least one of the first network and a second network responsive to the authentication service granting permission to the portable communication device. The method also includes controlling the plurality of communication devices for the hearing impaired with the portable communication device.

DETAILED DESCRIPTION

Figure 1:
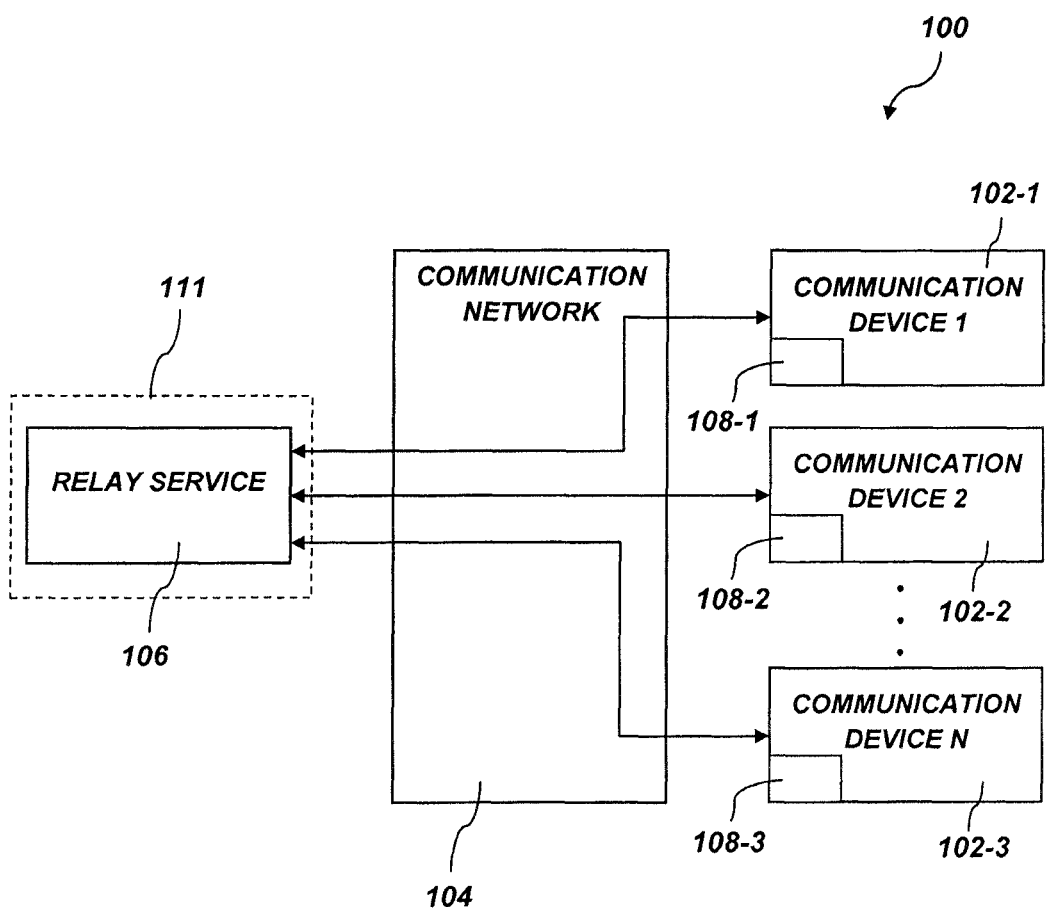
FIG. 1 is a simplified block diagram of a conventional communication system for the hearing impaired.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments include systems and methods for controlling communication systems for the hearing impaired. It should be noted that while the utility and application of the various embodiments of the disclosure are described with reference to a hearing impaired environment, the disclosure also finds application to any environment where control over one or more communication devices may be helpful or desirable.

The term "incoming call" refers to an incoming communication to a communication device such as a portable communication device. This incoming communication should be considered to include communications such as E-mail, text messages, instant messages, voice communications, and video communications.

As used herein, the terms "connect," "connecting," "connection," and other derivations of "connect" refer to communicating or establishing a communication between two or more elements. These terms do not necessarily mean that there is a physical connection between the elements. The "connection" may be through an appropriate wireless communication network as well as a wired communication network.

Figure 2:
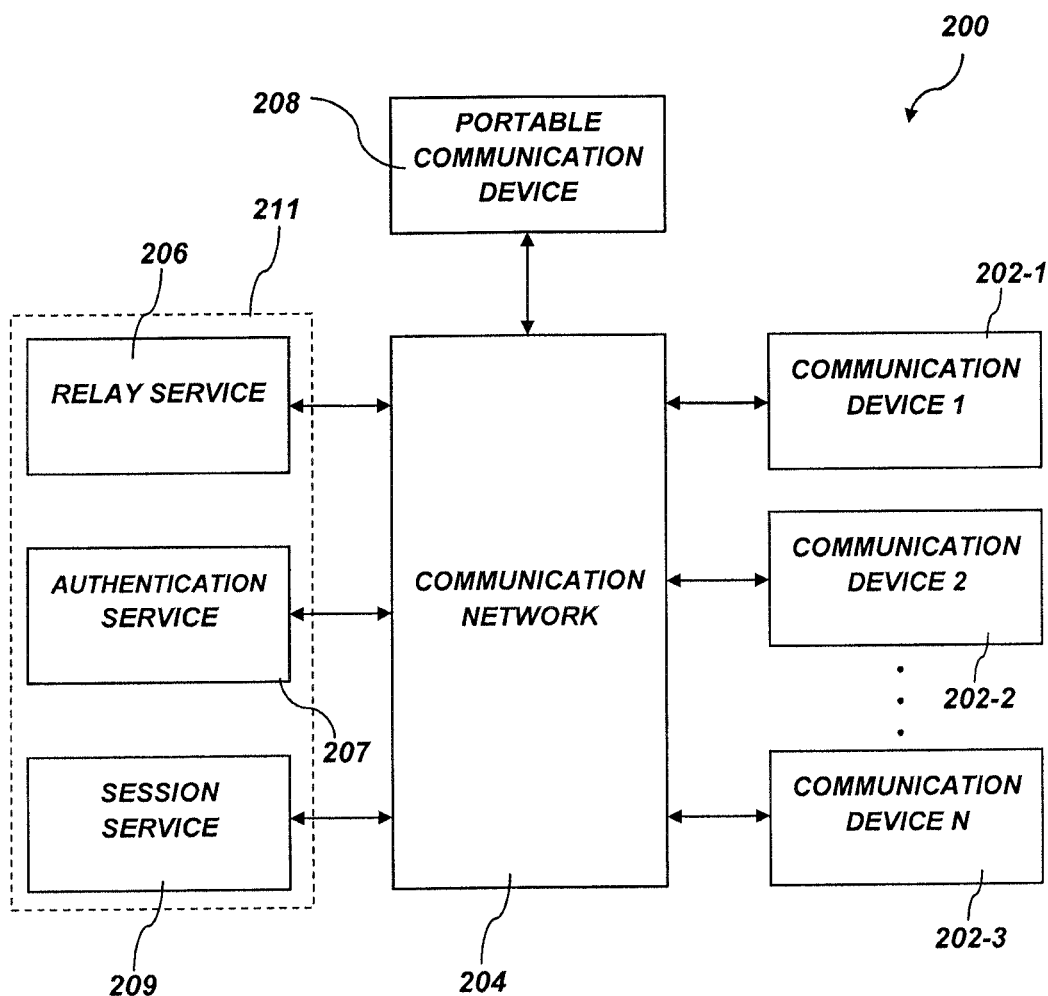
FIG. 2 is a simplified block diagram of a communication system.

FIG. 2 is a simplified block diagram of a communication system 200. The communication system 200 may include a plurality of communication devices 202. The communication system 200 may also include a communication network 204, a portable communication device 208, and one or more servers 211.

Each of the plurality of communication devices 202 may comprise a communication device for the hearing impaired, including a video phone capability. Although the simplified block diagram of FIG. 2 illustrates three communication devices 202-1, 202-2, 202-3, the disclosure contemplates any number, including one, of communication devices.

Each of the plurality of communication devices 202 may be placed in different locations in or around a building. By way of example, and not of limitation, the plurality of communication devices 202 may each be placed in a different room of a dwelling. One or more of the plurality of communication devices 202 may additionally be placed in locations remote from others of the plurality of communication devices 202, such as in different buildings. By non-limiting example, one or more communication devices 202 may be located at a user's home, and another communication device 202 may be located at the user's place of employment.

The plurality of communication devices 202 may be physical hardware devices such as, for example, video phones, telephones, and cellular telephones. The plurality of communication devices 202 may also be software endpoints configured to be accessed on devices configured to execute software commands, such as, for example, smart phones, tablet computers, desktop computers, laptop computers, and HDMI sticks.

Each of the plurality of communication devices 202 may be configured to connect to the one or more servers 211 through the communication network 204. The communication network 204 may comprise any one or combination of a personal area network (PAN), a local area network (LAN), a wide area network (WAN), or other kind of network.

The one or more servers 211 may be configured to provide services to the one or more communication devices 202. The one or more servers 211 may include a relay service 206 configured to provide a hearing impaired user the ability to communicate with standard telephone users, such as, for example, hearing capable individuals. By way of non-limiting example, the relay service 206 may include a sign language translation service, a text to voice service, a voice to text service, or combinations thereof. The relay service 206 is configured to connect to the communication network 204.

The one or more servers 211 may also include an authentication service 207 configured to authenticate the user of a communication device 202, allowing that user to control the functionality of the communication device 202 and/or access the services provided by the one or more servers 211. The authentication service 207 is configured to connect to the communication network 204.

The one or more servers 211 may additionally include a session service 209. The session service 209 may be configured to initiate and administer communication sessions for the communication devices 202. The communication sessions may include communications such as voice communications and video communications. By way of non-limiting example, the communication sessions may include the sign language translation, text to voice, and voice to text communication sessions discussed above with respect to the relay service 206. Also by way of non-limiting example, the session service 209 may utilize a Session Initiation Protocol (SIP), an H.323 protocol, and other suitable protocols.

In some embodiments, the one or more servers 211 may be a single server device connected to the communication network 204. The various functions described with respect to the relay service 206, the authentication service 207, and the session service 209 may consequently be performed by a single device. In other embodiments, the one or more servers 211 may be more than one server device. The various functions described with respect to the relay service 206, the authentication service 207, and the session service 209 may consequently be performed by separate server devices. In still other embodiments, the various functions of the relay service 206, the authentication service 207, and the session service 209 may be performed by two or more server devices, and may not necessarily be isolated to separate server devices.

The portable communication device 208 may be configured to connect to the authentication service 207 through the communication network 204. The portable communication device 208 may also be configured to send a request to the authentication service 207 to obtain permission to connect to and control the plurality of communication devices 202.

The portable communication device 208 also may be configured to connect to and control the plurality of communication devices 202 through the communication network 204, which may occur responsive to receiving permission from the authentication service 207 in some cases. The portable communication device 208 may also be configured to control the plurality of communication devices 202 with a transmission control protocol (TCP), a user datagram protocol (UDP), or other suitable protocol. It will be appreciated that the portable communication device 208 may alternatively connect to the authentication service 207 through a first network (not shown), and to the plurality of communication devices 202 through a second network (not shown). As a non-limiting example, the first network may be a "Wi-Fi" type network and the second network may be a "BLUETOOTH®" type network.

The portable communication device 208 may be further configured to cause a call to transfer from a first communication device 202-1 to a second communication device 202-2 responsive to the portable communication device 208 receiving a command from a user of the portable communication device 208 through a user interface of the portable communication device 208. The portable communication device 208 may be configured to perform the transfer with a session initiation protocol (SIP), an H323 protocol, or other suitable protocol.

Figure 3:
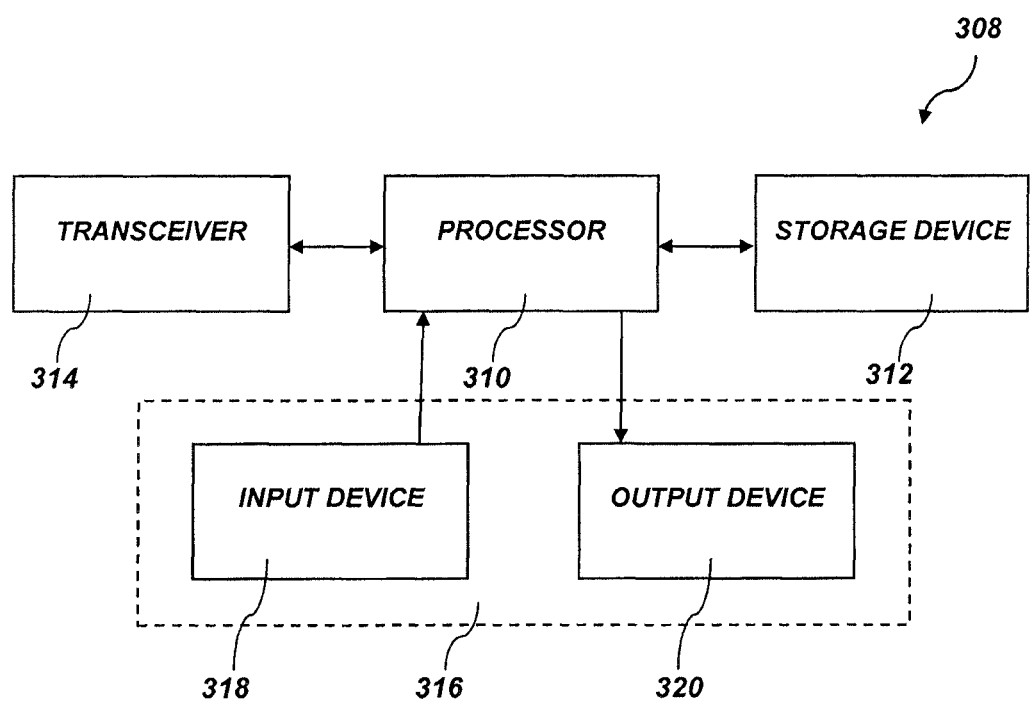
FIG. 3 is a simplified block diagram of a portable communication device.

FIG. 3 is a simplified block diagram of a portable communication device 308. The portable communication device 308 may include any of a tablet computer, a laptop computer, a cellular telephone, and any other portable device configured to send and receive communications. The portable communication device may include a processor 310, a storage device 312, one or more transceivers 314, an input device 318, and an output device 320. The processor 310 may be configured to operably couple to and control the transceiver 314, the storage device 312, the input device 318, and the output device 320.

The storage device 312 may include any one or combination of a random access memory, a computer readable media, a flash memory, and an erasable programmable read only memory, etc. The storage device 312 may be configured to store any of a list of contacts, a call history, a voicemail greeting, a voicemail message, and a plurality of machine-executable commands for controlling the portable communication device 308.

The transceivers 314 are configured to operably connect the portable communication device 308 to the communication network 204. The transceiver may include a wireless communication device configured to connect the portable communication device 308 to the communication network 204. By way of example, and not of limitation, the transceivers 314 may be configured to connect to the communication network 204 through a "Wi-Fi" connection. In the other embodiments, the transceivers 314 may include a communication port configured to connect the portable communication device 308 to the communication network 204 through a cable. By way of example, and not of limitation, the communication port may be configured to connect to an Ethernet cable.

The input device 318 and the output device 320 may optionally be implemented as a single input-output device 316 such as a touch-screen display. In other embodiments of the disclosure, the input device 318 and the output device 320 may be implemented as separate devices. By way of example, and not of limitation, the input device 318 may include any of a mouse, a keyboard, a track pad, a button array, and a remote control. Also by way of example, and not of limitation, the output device may include an LED array, a segmented display, a liquid crystal display, a cathode ray tube display, and a plasma display. The output device 320 may be configured to display a user interface (not shown). The input device 318 may be configured to receive a command from the user.

Figure 4:
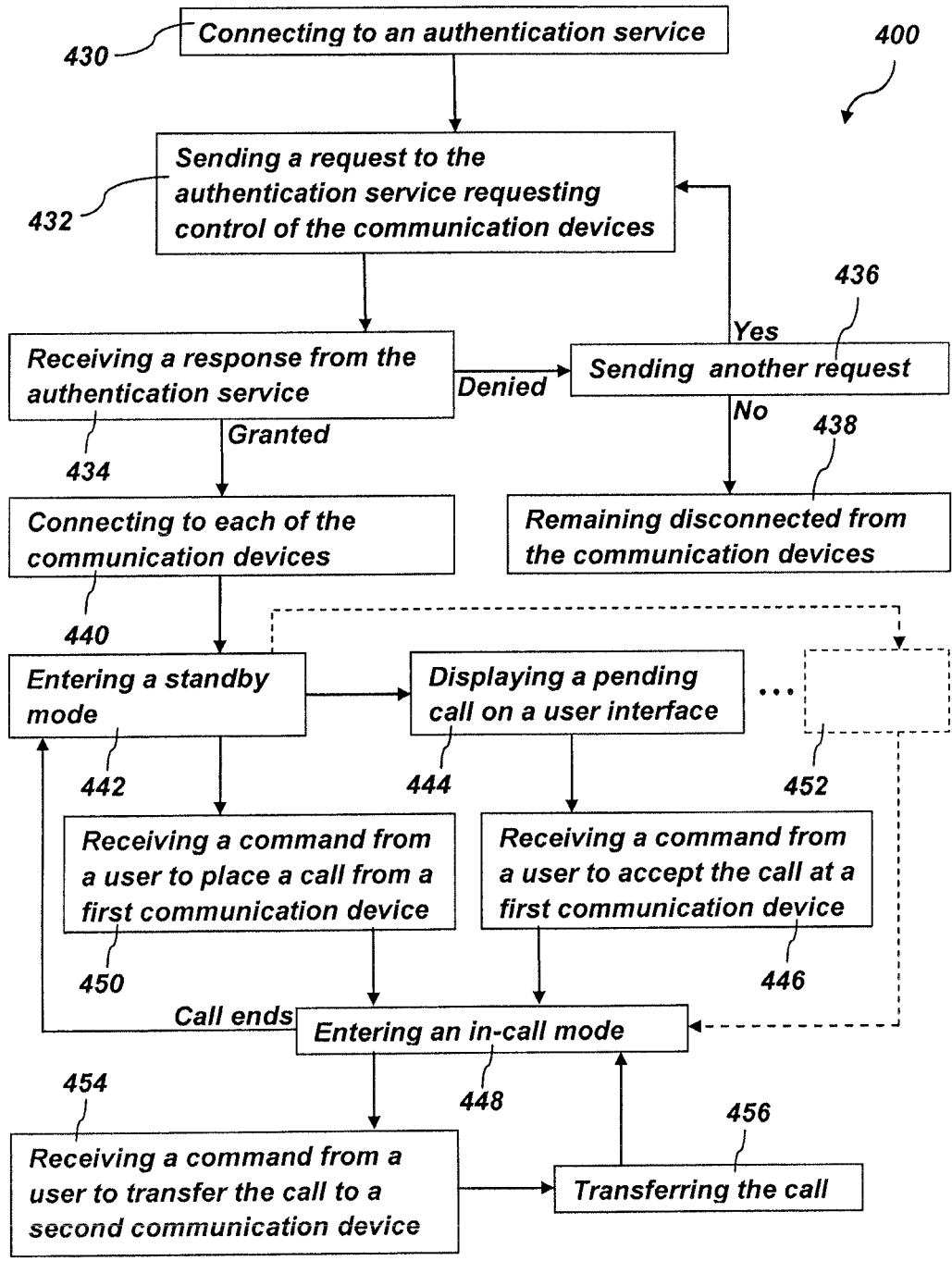
FIG. 4 is a flow chart of a method of controlling a communication system with a portable communication device.

FIG. 4 is a flow chart illustrating a method 400 of controlling a communication system 200 with a portable communication device 208 (FIG. 2). Referring to FIGS. 2 and 4, the method 400 may include operational block 430, comprising connecting to an authentication service 207. The method 400 may also include operational block 432, comprising sending a request to the authentication service 207 requesting control of the communication devices 202. Sending a request to the authentication service 207 requesting control of the communication devices 202 may include sending a user name and password to the authentication service 207, or sending a trusted device identification such as an internet protocol (IP) address or a media access control (MAC) address to the authentication service 207.

The method 400 may further include operational block 434, including receiving a response from the authentication service 207. If the response indicates the request is denied, the method 400 may include operational block 436, including sending another request to the authentication service 207. If, however, another request is not sent to the authentication service 207, the method 400 may comprise operational block 438, including remaining disconnected from the communication devices 202.

If the response from the authentication service 207, however, indicates that the request is granted, then the method 400 may include operational block 440, comprising connecting to each of the communication devices 202. The method 400 may further comprise operational block 442, including entering a standby mode once the portable communication device 208 is connected to the communication devices 202.

From the standby mode, the portable communication device 208 may utilize one of several avenues to transition to operational block 448, which includes an act of entering an in-call mode. A first avenue may include operational block 450 comprising an act of receiving a command from a user to place a call from a first communication device 202-1. A second avenue may include operational block 444, including displaying a pending call on a user interface. The second avenue may also include operational block 446, comprising receiving a command from a user to accept the call at the first communication device 202-1. The portable communication device 208 may also enter the in-call mode through another avenue, represented by operational block 452 (shown with dashed lines), which may include placing a call or receiving a call directly on the portable communication device 208, or any other act suitable to transition the portable communication device 208 to the in-call mode.

During the in-call mode, the method 400 may comprise operational block 454, including a step of receiving a command from a user to transfer the call to a second communication device 202-2. The method may then include operational block 456, comprising transferring the call to the second communication device 202-2.

After transferring the call, the portable communication device 208 may return to the in-call mode. Upon termination of the call, the portable communication device 208 may once again return to operational block 442, including the act of entering the standby mode.

Figure 5:
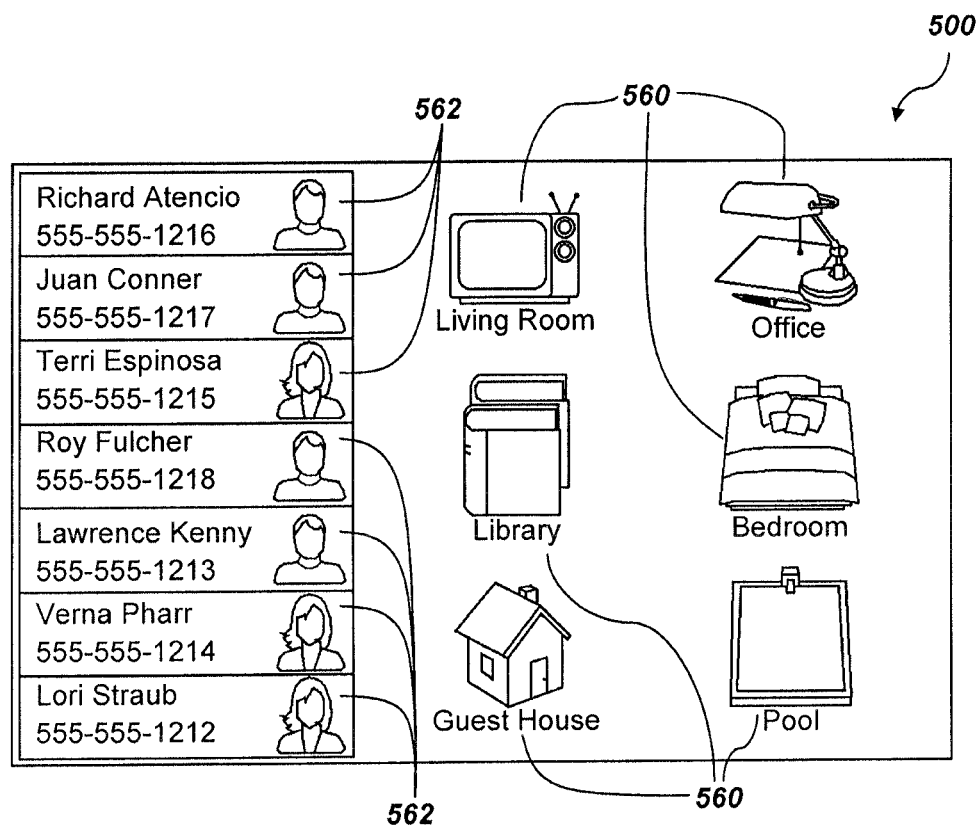
FIG. 5 is a simplified schematic illustration of a user interface of a portable communication device in a standby mode.

FIG. 5 is a simplified schematic illustration of a user interface 500 of a portable communication device 308 (FIG. 3) in a standby mode. The user interface 500 may include a plurality of contact icons 562 and a plurality of communication device icons 560. Each of the contact icons 562 may display information about each of a plurality of contacts that correspond to each of the contact icons 562. The information about each of the plurality of contacts may include any of a name, a nickname, a telephone number and an image of the contact.

Each of the communication device icons 560 may correspond to one of the plurality of communication devices 202. Each of the communication device icons 560 may be configured to display information about the corresponding communication device 202 (FIG. 2). By way of example, and not of limitation, each communication device icon 560 may display any of an identifier, a location of the communication device 202, and an operational state of the communication device 202.

To enter an in-call mode, a user may select a contact icon 562 corresponding to the contact that the user wishes to call. The user may also select a communication device icon 560 that corresponds to a communication device 202 that the user wishes to utilize for the call. In some embodiments of the disclosure, the user may select the desired contact icon 562, and drag it near to the desired communication device icon 560 to place a call. In other embodiments, the user may select the desired contact icon, and then select the desired communication device icon 560 to place a call.

Selecting and dragging a contact icon 562 to a communication device icon 560 may include selecting and dragging the contact icon 562 with a mouse. In other embodiments, selecting and dragging the contact icon 562 to the communication device icon 560 may include touching and dragging the contact icon 562 on a touch-screen. Furthermore, selecting and dragging may comprise utilizing a button array or a track pad.

Figure 6:
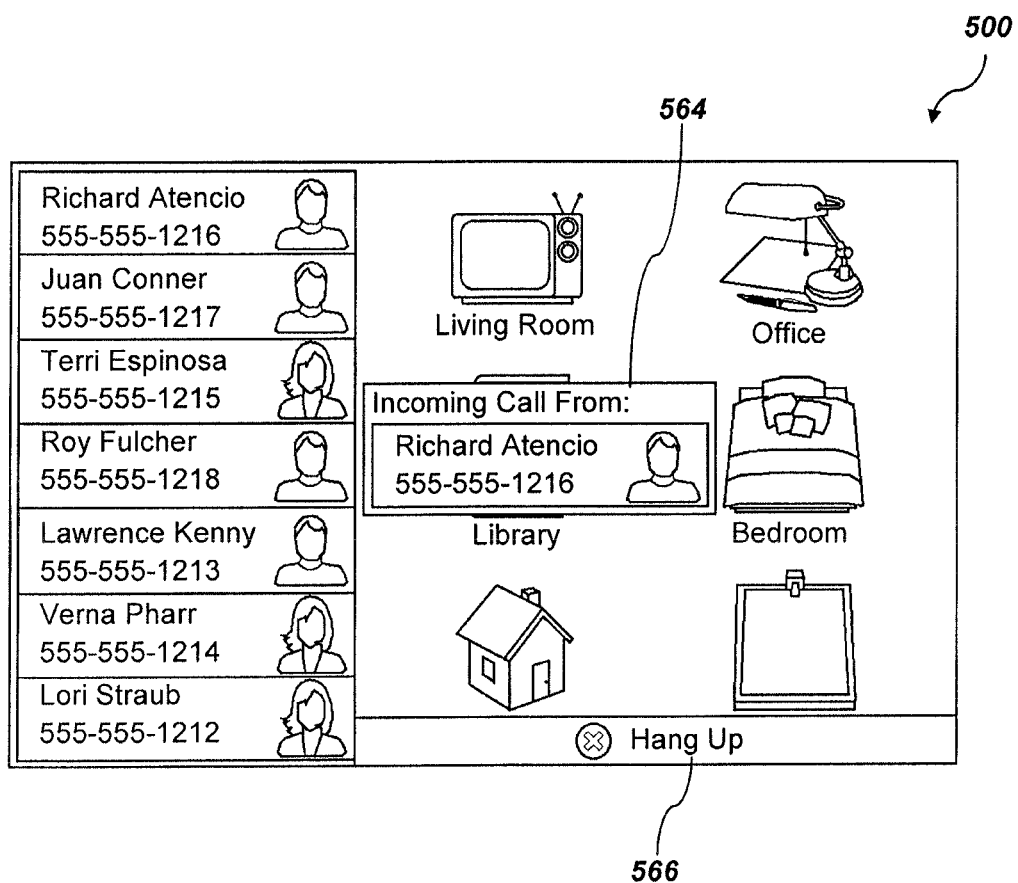
FIG. 6 illustrates the user interface of FIG. 5 indicating an incoming call.

FIG. 6 is the user interface 500 of FIG. 5 indicating an incoming call. The user interface 500 may include an incoming call icon 564, and a "hang up" option 566. The incoming call icon 564 may display information about a caller that corresponds to the incoming call icon 564. The information about the caller may include any of a name, a nickname, a telephone number and an image of the caller.

The user may select the hang up option 566, causing the portable communication device 308 to reject the incoming call, and remain in the standby mode. Also, the user may select the incoming call icon 564, and a communication device icon 560 (see FIG. 5) that corresponds to the communication device 202-1, 202-2, 202-3 that the user desires to utilize in the call. As described above with respect to placing a call, selecting the incoming call icon 564 and a communication device icon 560 may comprise selecting and dragging the incoming call icon 564 with a mouse, by touching a touch-screen, or utilizing a button array or a track pad.

Figure 7:
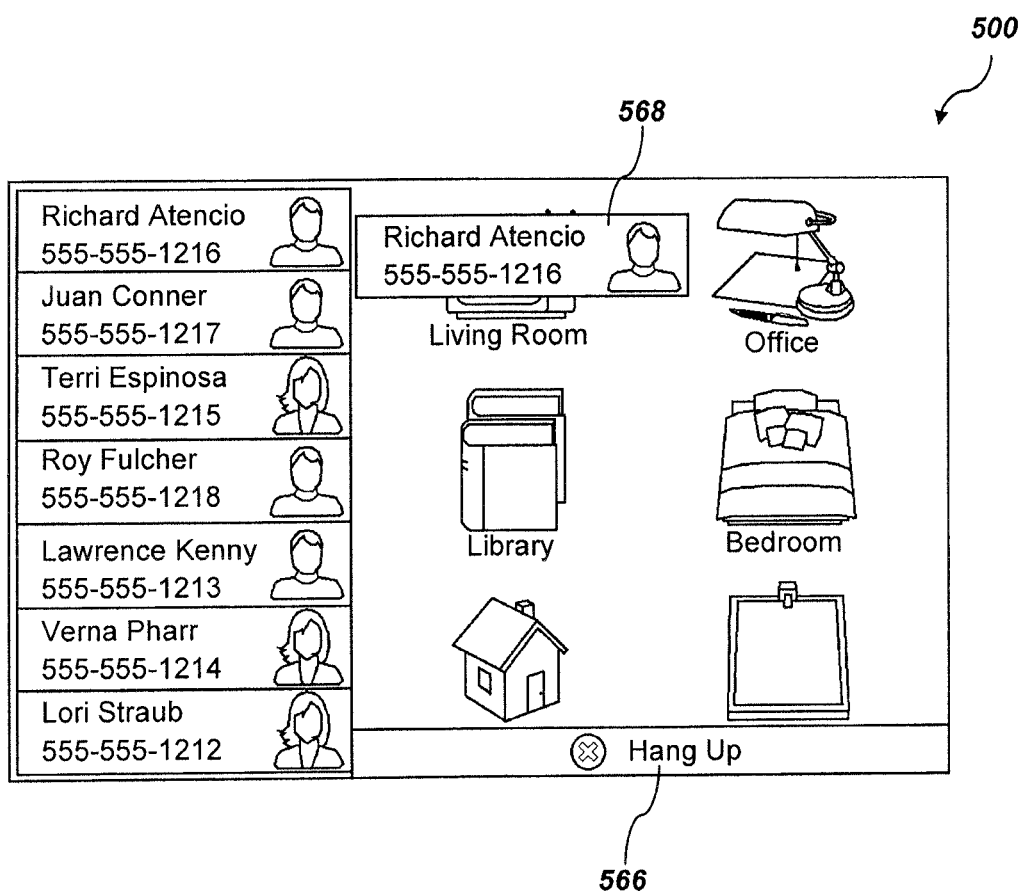
FIG. 7 illustrates the user interface of FIG. 5 in an in-call mode.

FIG. 7 is the user interface 500 of FIG. 5 in an in-call mode. The user interface 564 may display an in-call icon 568 corresponding to the contact the user is communicating with, in proximity to the communication device icon 560 that corresponds to the communication device 202-1, 202-2, 202-3 the user selected for the call. The user interface 500 may also display the "hang up" option.

The in-call icon 568 may display information about a contact the user is in-call with. The information about the contact may include any of a name, a nickname, a telephone number and an image of the contact. In the embodiment of the disclosure illustrated in FIG. 7, the user is in call with contact "Richard Atencio" on a "living room" communication device.

During the in-call mode, the user may transfer the call to another of the communication devices 202 by selecting another of the communication device icons 560. In some embodiments of the disclosure, the user interface 500 may accept a select and drag input, as described above, to transfer a call from a first communication device 202-1 to a second communication device 202-2. A select and drag input may comprise a user selecting the in-call icon 568, and dragging the in-call icon to another communication device icon 560 by using a mouse or by touching a touch-screen. Alternatively, selecting and dragging may comprise utilizing a button array or a track pad.

The hang up option 566 allows the user to end the call, returning the user interface 500 to the standby mode.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video communication system comprising:
   a plurality of video communication devices including at least a first video communication device and a different second video communication device that are configured to engage in a video call with a remote video communication device; and
   a portable communication device configured to:
   connect to the plurality of video communication devices through a local communication network to control operations of the plurality of video communication devices thereof; and
   receive a command from a user through a user interface of the portable communication device thereof and cause an ongoing call between the first video communication device and the remote video communication device to be transferred from the first video communication device to the second video communication device responsive to the command such that the second video communication device is connected to the ongoing call with the remote video communication device instead of the first video communication device, wherein the user of the portable communication device is the same user of the first video communication device instead of a third-party remote agent.

2. The video communication system of claim 1, wherein the remote video communication device is a video relay service configured to provide sign language translation services to the user of the user of the first video communication device and the second video communication device.

3. The video communication system of claim 1, wherein the portable communication device is configured to communicate using at least one of a transmission control protocol (TCP), a user datagram protocol (UDP), a session initiation protocol (SIP), an H323 protocol, or a Bluetooth protocol.

4. The video communication system of claim 1, wherein the portable communication device is selected from the group consisting of a tablet computer, a laptop computer, and a cellular telephone.

5. The video communication system of claim 1, wherein the portable communication device is further configured to store a contact list and a call history for the plurality of video communication devices.

6. The video communication system of claim 5, wherein the portable communication device is further configured to store voicemail messages for the plurality of video communication devices.

7. The communication system of claim 5, wherein the portable communication device comprises a screen configured to display a plurality of contact icons for each contact within the contact list.

8. The communication system of claim 1, wherein the portable communication device comprises a screen configured to display a plurality of device icons, each device icon of the plurality corresponding to one of a plurality of communication devices that are connected with the portable communication device.

9. The communication device of claim 8, wherein each device icon includes at least one of a name identifier, a location identifier, an operation state, or any combination thereof for its corresponding video communication device.

10. The communication system of claim 8, wherein the screen is further configured to display a call icon located proximate a first device icon of the plurality of device icons, the first device icon corresponding to the first video communication device.

11. The communication device of claim 1, wherein the portable communication device is further configured to initiate an outgoing call from the first video communication device to a device associated with a first contact from the contact list responsive detecting the user selecting a first device icon corresponding to the first video communication device and a first contact icon corresponding to the first contact.

12. The communication system of claim 1, wherein the first video communication device and the second video communication device are located within a same building.

13. The communication system of claim 1, wherein the local communication network is at least one of a local Wi-Fi network or a Bluetooth network.

14. A method of controlling a video communication system, the method comprising:

connecting a plurality of video communication devices including a first video communication device and a second video communication device to a local communication network;

connecting a portable communication device to the first video communication device through the local communication network to control the first video communication device;

establishing a call between the first video communication device and a remote video communication device through the local communication network;

receiving a command responsive to an input from a user of the first video communication device through a user interface of the portable communication device, wherein the user operating the portable communication device is the same user of the first video communication device instead of a third-party remote agent; and transferring an ongoing call from the first video communication device to the second video communication device responsive to the command such that the second video communication device is connected to the ongoing call with the remote video communication device instead of the first video communication device.

15. The method of claim 14, further comprising:

presenting the user with a plurality of device icons on the user interface of the portable communication device, the plurality of device icons corresponding to the plurality of video communication devices associated with the user; and presenting the user with an in-call icon on the user interface of the portable communication device, the in-call icon indicating details regarding the ongoing call.

16. The method of claim 15, further comprising sensing the user selecting the call icon and device icon corresponding to the second video communication device for generating the input that causes the portable communication device to transfer the ongoing call from the first video communication device to the second video communication device.

17. The method of claim 16, wherein sensing the user selecting the call icon and the second video communication device includes sensing the user dragging the call icon from a first location on the user interface that is proximate the device icon corresponding to the first video communication device to a second location proximate the device icon corresponding to the second video communication device.

18. A system for assisting hearing-impaired users during calls with translation services, the system comprising:

a relay service configured to provide the translation services during calls involving at least one hearing-impaired user;

a plurality of communication devices configured to communicate via a local communication network with the relay service during calls to receive the translation services, the plurality of communication devices including at least a first communication device and a second communication device associated with a user; and a portable communication device configured to:

connect with the plurality of communication devices to control operations through the local communication network thereof; and cause an ongoing call between the first communication device and the relay service to be transferred from the first communication device to the second communication device responsive to an input command from the at least one hearing-impaired user to the portable communication device such that the second communication device is connected to the ongoing call with the relay service instead of the first communication device, wherein the user of the portable communication device is the same user as the first communication device and not a third-party remote agent.

19. The system of claim 18, wherein the translation services include at least one of sign language translation services, text to voice services, voice to text services, or combinations of any thereof.

20. The system of claim 19, wherein the portable communication device is further configured to present a plurality of device icons corresponding to the plurality of communication devices associated with the user, and from which the user selects a desired communication device to transfer the ongoing call to during an in-call mode of the portable communication device.

* * * * *